United States Patent Office 3,168,243
Patented Feb. 2, 1965

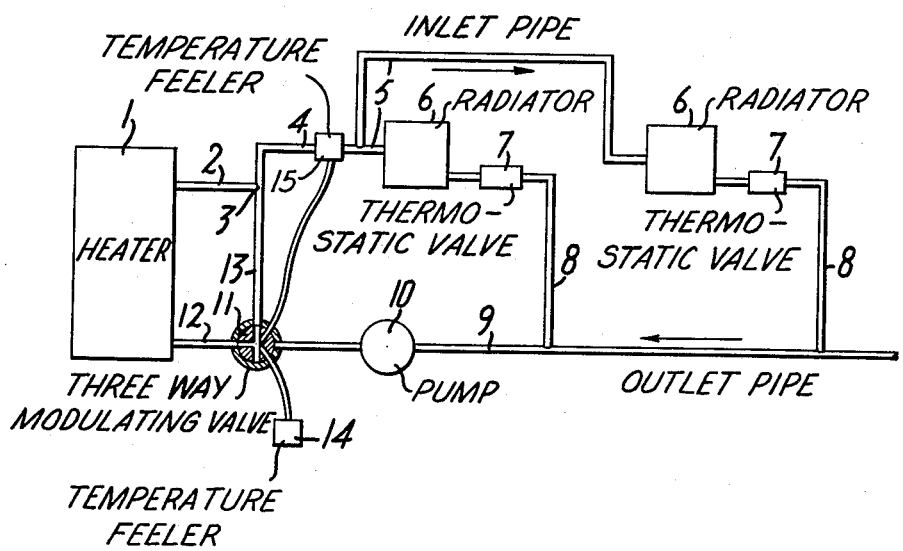

3,168,243
HEATING SYSTEM
Kjeld Rikard Porland, Ringgade 68, Sonderborg, Denmark
Filed June 27, 1961, Ser. No. 173,844
Claims priority, application Germany, May 4, 1960,
D 33,258
4 Claims. (Cl. 237—8)

This is a continuation-in-part of my co-pending application filed May 4, 1961, entitled "Method for Activating a Hot Water Heating System" Serial No. 107,731, now abandoned.

The invention relates to a system for the operation of a hot-water heating plant with a plurality of radiators connected in parallel and is more particularly concerned with a system of the character indicated for a remote control heating plant.

It is the goal of all regulation of a heating plant to achieve, as far as possible, a uniform temperature with the least possible consumption of heat in order to obtain the best possible utilization of the radiation surface. Nevertheless, it is desirable to provide for the possibility of individual room temperature regulation. Various proposals for achieving this goal have been made but all have suffered from one or more disadvantages or drawbacks.

It is the object of this invention to provide a control system which makes possible a closer approach to the desired goal.

According to the invention, this and other objects are achieved by controlling the inlet water temperature to the radiator in relation to the outlet water temperature and by keeping the temperature of the water returning from each individual radiator somewhat above the desired room temperature, whereby the return water temperature may be set at a fixed value or controlled in relation to the room temperature.

With such a procedure there is obtained the lowest possible mean temperature for each separate radiator, that is, the lowest heat consumption. In addition, the heat losses in the entire pipe system are kept to a minimum. This is due to the fact that the return water temperature has the smallest possible value. The same is true of the inlet water temperature which, considering all the circumstances, also has the lowest possible value.

It is known to arrange a valve at the outlet of a radiator which throttles the discharge section in such a way that the temperature of the returning water is held somewhat constant. In this case, it is disadvantageous that the inlet water temperature has a standard value, that is about 70 to 90°, and the filling of the radiator, therefore, takes place periodically, so that strong fluctuations in room temperature cannot be avoided. This is especially true in the case of relatively high room temperatures, for then the cooling of the radiator contents takes place slowly and, accordingly, there is a relatively large time constant in the regulation circuit.

It is also known to lower the inlet water temperature by mixing part of the return water with the inlet water. It is true that in this case the inlet water temperature may be lowered to an acceptable value, but the amount of the flow of water is without any control so that a high consumption of water and a high return water temperature cannot be avoided. It is likewise disadvantageous that the temperature of the returning water is subject to large fluctuations so that the admixture with the inlet water cannot be effected with clearly defined quantitites but depends on a multiplicity of values, which either cannot be controlled or which bring about very disturbing temperature fluctuations in the regulation circuit.

In accordance with the invention, a portion of the return water is admixed with the inlet or feed water in relation to the outside temperature in order to obtain the desired inlet water temperature, the outside temperature-indicating device preferably controlling a three-way valve whose two branches lead to the return piping and the inlet water piping. Such control independence upon the outside temperature has the advantage that the entire heating plant quickly adapts itself to the temperature fluctuations conditioned on the seasons, with its lead temperature. In addition, the three-way valve has the advantage that all mixing ratios can be accurately adjusted.

Further characteristics of the invention will be apparent from the following detailed description in relation to the illustrative embodiment of the invention shown in the drawing which illustrates diagrammatically a hot water heating system according to the invention.

A tank or heating unit 1 supplies feed or inlet water at a temperature of 70° to 90° over a main pipe 2, a mixing point 3, a common inlet pipe 4, and individual inlet pipes 5 to the radiators 6 which are connected in parallel. Each radiator is provided at its outlet with a thermostatic valve 7, which may be of conventional type, and which holds the return temperature somewhat above the desired room temperature. The return water flows through the parallel return pipes 8, the common return pipe 9, and a pump 10, to a three-way valve 11, from which it is led partly through the return pipe 12 to the heating plant or tank 1 and partly through the connection pipe 13 to the mixing point 3 of the feed piping. The three-way valve 11 is controlled by a temperature responsive unit 14 which is affected by the outside temperature. For accurate adjustment of the inlet water temperature, return of water is also controlled by means of a temperature-sensitive element 15 provided in the common inlet piping.

In operation, depending on the outside temperature, sufficient return water of approximately constant temperature is admixed with the feed water so that the inlet water temperature has the lowest possible value. When the outside temperature drops, the amount of admixed return water is less so that the inlet temperature rises accordingly. The valves are selected so that the increase in the inlet water temperature, and therefore the increase in the mean temperature of each radiator, is only that necessary to maintain a constant temperature in the room. In addition, a separate regulation of each radiator is possible because the various heated rooms are subjected to varying influances, viz. sunshine, wind, etc. In this connection it is advantageous to adjust the thermostatic valve of each radiator either manually to a separate value or to effect the control of this valve in relation to the actual room temperature.

There is thus provided a heating plant which insures optimum utilization of the amount of heat supplied to the plant but which does not exclude the possibility of separate regulation of the individual radiators. The system of this invention is free from the complexities of known systems and thus is less expensive to provide than previously with general and individual regulation.

In the foregoing system, it will be understood that conventional units are employed unless otherwise indicated. Thus, the unit 1 is a conventional oil or gas fired, thermostatically controlled furnace, such as described in U.S. Patent No. 2,077,402, and the thermostatic controls 7 are devices of well known construction for this purpose, as described in U.S. Patent No. 2,342,-157. The three-way modulating valve 11 is of a known type which is described, for example, in U.S. Patent No. 2,355,043 and the temperature sensitive elements 14 and 15 are of any convenient type, e.g. they are liquid filled elements which have a known construction such as described in U.S. Patent No. 2,355,043. The control of the valve 11 in response to the indications of the temperature sensitive elements 14 and 15 is carried out in conventional manner such as described in U.S. Patent No. 2,355,043.

In a typical installation, the following is an example of typical operation. Water supplied at a temperature of 80° C. from heating unit 1 enters line 4 at a rate to form a liquid stream having a temperature of 60° C. and passes to radiators 6 which are intended to maintain the rooms in which they are situated at a temperature of 20° C. The thermostatic valve 7 regulates the outflow of water from the radiators at a temperature of 25° C. and this water is drawn by pump 10 and fed through valve 11. With the outside temperature at 0° C. and the temperature in the line 4 at 60° C., the valve divides the outflowing water in line 9, which is at a temperature of 25° C., into a stream passing into line 12 and into a stream passing into line 13 in the ratio of 1 to 10 respectively. Thus, the water at a temperature of 22° C. in line 13 mixes with the water at a temperature of 80° C. in line 2 at the juncture 3 in the ratio of 1 to 10 so that the blended water in line 4 has the above-indicated temperature of 60° C. Changes in the outside temperature are sensed by the unit 14 and appropriate automatic adjustment of valve 11 is effected, this adjustment being modified, when necessary, by the action of the unit 15 which responds to changes in the temperature in the water in line 4. Thus, in the event of an outside temperature drop, the valve will respond to the element 14 and the resulting setting will be modified by the element 15, e.g. the net effect of the two elements will be an activation of the closing member of the valve a fraction toward its closed position so that a lesser amount of return water will be mixed with the feed water.

It will be understood that the invention is not limited to the particular types of known components referred to above and that various changes and modifications may be made in the invention without departing from its scope as defined in the appended claims. It is intended, therefore, that all matter contained in the foregoing description and in the drawing shall be interpreted as illustrative only and not as limitative of the invention.

What I claim and desire to secure by Letters Patent is:

1. A system for the maintenance of predetermined temperatures in rooms provided with a plurality of radiators supplied with water in parallel from a source of heated water, including a heating unit, which comprises an individual outlet line from each radiator, a common outlet line connected to the individual outlet lines from all of said radiators, a modulating thermostatic valve in the individual outlet line of each of said radiators, said thermostatic valve responding both to the room temperature and to the individual outlet line water temperature, an inlet line from the source of heated water to said radiators, and means for mixing a selected portion of the water contained in said common outlet line with the water contained in said inlet line, said means including a modulating three-way valve for selectively dividing the flow of water in said common outlet line to said inlet line and to said source of heated water, said three-way valve being regulated in response to the exterior temperature.

2. A system for the maintenance of predetermined temperatures in rooms provided with a plurality of radiators supplied with water in parallel from a source of heated water, including a heating unit, which comprises an individual outlet line from each radiator, a common outlet line connected to the individual outlet lines from all of said radiators, a modulating thermostatic valve in the individual outlet line of each of said radiators, said thermostatic valve responding both to the room temperature and to the individual outlet line water temperature, an inlet line from the source of heated water to said radiators, and means for mixing a selected portion of the water contained in said common outlet line with the water contained in said inlet line, said means including a modulating three-way valve for selectively dividing the flow of water in said common outlet line to said inlet line and to said source of heated water, said three-way valve being regulated only in response to the exterior temperature and in response to variations from the predetermined temperature in said inlet line.

3. A system for the maintenance of predetermined temperatures in rooms provided with a plurality of radiators supplied with water in parallel from a source of heated water, including a heating unit, which comprises an individual outlet line from each radiator, a common outlet line connected to the individual outlet lines from all of said radiators, a modulating thermostatic valve in the individual outlet line of each of said radiators, said thermostatic valve responding both to the room temperature and to the individual outlet line water temperature, an inlet line from the source of heated water to said radiators, and means for mixing a selected portion of the water contained in said common outlet line with the water contained in said inlet line, said means including a modulating three-way valve for selectively dividing the flow of water in said common outlet line to said inlet line and to said source of heated water, said three-way valve being regulated in response to the exterior temperature, and a pump being disposed in said common outlet line upstream of said valve.

4. A system for the maintenance of predetermined temperatures in rooms provided with a plurality of radiators supplied with water in parallel from a source of heated water, including a heating unit, which comprises an individual outlet line from each radiator, a common outlet line connected to the individual outlet lines from all of said radiators, a modulating thermostatic valve in the individual outlet line of each of said radiators, said thermostatic valve responding both to the room temperature and to the individual outlet line water temperature, an inlet line from the source of heated water to said radiators, and means for mixing a selected portion of the water contained in said common outlet line with the water contained in said inlet line, said means including a modulating three-way valve for selectively dividing the flow of water in said common outlet line to said inlet line and to said source of heated water, said three-way valve being regulated only in response to the exterior temperature, and in response to variations from the predetermined temperature in said inlet line, and a pump being disposed in said outlet line upstream of said valve.

References Cited in the file of this patent

UNITED STATES PATENTS

| | | |
|---|---|---|
| 1,931,145 | Hall | Oct. 17, 1933 |
| 2,181,480 | Gillett et al. | Nov. 28, 1939 |
| 2,211,573 | McGrath | Aug. 13, 1940 |
| 2,342,157 | Miller | Feb. 22, 1944 |
| 2,545,206 | Main | Mar. 13, 1951 |
| 2,661,906 | Stahlberg | Dec. 8, 1953 |

EDWARD J. MICHAEL, Primary Examiner.

FREDERICK L. MATTESON, JR., PERCY L. PATRICK, Examiners.